United States Patent [19]

Miska et al.

[11] Patent Number: 5,703,930

[45] Date of Patent: Dec. 30, 1997

[54] PERSONAL MOBILE COMMUNICATION SYSTEM WITH CALL BRIDGING

[75] Inventors: Richard A. Miska, Belle Mead; William T. Willcock, Rumson, both of N.J.

[73] Assignee: AT&T Corp., Middletown, N.J.

[21] Appl. No.: 796,833

[22] Filed: Feb. 6, 1997

Related U.S. Application Data

[63] Continuation of Ser. No. 606,230, Feb. 23, 1996, abandoned, which is a continuation of Ser. No. 424,825, Apr. 19, 1995, abandoned, which is a continuation of Ser. No. 138,887, Oct. 19, 1993, abandoned, which is a continuation of Ser. No. 667,734, Mar. 11, 1991, abandoned.

[51] Int. Cl.$^6$ .............................. H04Q 7/08; H04Q 7/20; H04Q 7/24; H04Q 7/38
[52] U.S. Cl. .............................. 379/57; 379/58; 379/59; 379/60; 379/63
[58] Field of Search .............................. 379/57, 58, 59, 379/60, 63

[56] References Cited

U.S. PATENT DOCUMENTS

| | | | |
|---|---|---|---|
| 4,086,438 | 4/1978 | Kahn et al. | 379/158 |
| 4,191,860 | 3/1980 | Weber | 379/57 |
| 4,313,035 | 1/1982 | Jordan et al. | 379/57 |
| 4,451,705 | 5/1984 | Burke et al. | 379/211 |
| 4,642,425 | 2/1987 | Guinn, Jr. et al. | 379/57 |
| 4,661,972 | 4/1987 | Kai | 379/57 |
| 4,672,655 | 6/1987 | Koch | 379/57 |
| 4,893,327 | 1/1990 | Stern et al. | 379/59 |
| 4,893,335 | 1/1990 | Fuller et al. | 379/57 |
| 4,896,346 | 1/1990 | Belfield et al. | 379/57 |
| 4,901,340 | 2/1990 | Parker et al. | 379/60 |
| 4,942,598 | 7/1990 | Davis | 379/57 |
| 4,961,216 | 10/1990 | Baehr et al. | 379/57 |
| 5,036,533 | 7/1991 | Carter et al. | 379/59 |
| 5,056,086 | 10/1991 | Libonati | 370/62 |
| 5,063,591 | 11/1991 | Jodoin | 379/60 |

(List continued on next page.)

FOREIGN PATENT DOCUMENTS

| | | | |
|---|---|---|---|
| 0258084 | 3/1988 | European Pat. Off. | 379/57 |
| 0330856 | 2/1989 | European Pat. Off. | |
| 0503813 | 9/1992 | European Pat. Off. | 379/58 |
| 3329267 | 2/1985 | Germany. | |
| 6103564 | 8/1981 | Japan | 379/57 |
| 57-76940 | 5/1982 | Japan | 379/57 |
| 2234649 | 2/1991 | United Kingdom | H04B 7/26 |

OTHER PUBLICATIONS

C. Colavito "The Integrated Mobile Telephone & Paging System" International Conference on Communications, Jun. 1969, pp. 31–13 –31–18.

(List continued on next page.)

*Primary Examiner*—William Cumming
*Attorney, Agent, or Firm*—Thomas A. Restaino

[57] ABSTRACT

A communications system permits a personal mobile telecommunications device user, such as a cellular telephone subscriber, to complete a connection to a calling party that has attempted to reach the subscriber using the subscriber's assigned telephone number, even when the subscriber is roaming outside of his or her home area. The system includes a messaging and bridging complex having an associated database, which receives a call placed to the subscriber. If the subscriber is out of his or her home area so that the call cannot be completed, information stored in the database is used to initiate transmission of a paging signal to the subscriber. The connection to the calling party is held in the complex for a predetermined period after the paging signal is transmitted. The mobile telephone user, upon receiving the paging signal, may initiate a call from their personal mobile telecommunications device to the messaging and bridging complex, which bridges the subscriber and the calling party together. The system can also include interactive voice response equipment for advising the calling party that the call cannot be completed and that a paging signal is being transmitted. The calling party may also be offered other options, including an opportunity to use a voice mailbox or other facility to leave a message in the event that the call cannot be completed.

3 Claims, 5 Drawing Sheets

U.S. PATENT DOCUMENTS

| | | | |
|---|---|---|---|
| 5,127,042 | 6/1992 | Gillig et al. | 379/59 |
| 5,140,626 | 8/1992 | Ory et al. | 379/57 |
| 5,142,654 | 8/1992 | Sonberg et al. | 379/59 |
| 5,153,902 | 10/1992 | Buhl et al. | 379/57 |
| 5,153,903 | 10/1992 | Eastmond et al. | 379/57 |
| 5,166,973 | 11/1992 | Hoff | 379/57 |
| 5,202,912 | 4/1993 | Breeden et al. | 379/57 |
| 5,278,891 | 1/1994 | Bhagat et al. | 379/58 |
| 5,307,399 | 4/1994 | Dai et al. | 379/57 |
| 5,327,480 | 7/1994 | Breeden | 379/57 |
| 5,402,467 | 3/1995 | Watanabe | 379/57 |
| 5,428,663 | 6/1995 | Grimes et al. | 379/57 |
| 5,430,790 | 7/1995 | Williams | 379/63 |

OTHER PUBLICATIONS

G. Maile "Satellite Paging in Cellular Communications" International Conference on Cellular and Mobile Communications, 1985, pp. 295-213.

Ozawa and Hashimoto, "Voice Response System and Its Applications", Hitachi Review vol. 28, 1979.

Heller, "When Customers Call, You're Always A Beep Away", Inbound/Outbound Magazine, Apr. 1990.

"Satellite Paging in Cellular Communications" G. Maile, *Proceedings of the International Conference on Cellular and Mobile Communications* pp. 205-213, published by Online Publications, Pinner, UK, 1985.

"Public Radiopaging in Europe—From a UK Perspective" Rodney A. Stewart, *Telecommunications* Nov. 1987, pp. 35-47.

*Bell System Technical Journal* vol. 56, No. 7, pp. 1015-1320, published Sep. 1977 "No. 4 ESS".

PCT application No. PCT/US90/06729 filed Nov. 16, 1990, assigned to Fuller Research and Development Company.

"Voice Communication: Tying the Technologies Together" Anne Cobb Myers, The Office, May 1986, pp. 74-75.

"ERMES: Ready to Deliver?" Graham Finnie, *Telecommunications* Apr. 1989, pp. 61-63.

Brochure by AlphaNet Technology Corporation describing the Contribution of AlphaNet Technology to Facsimile Store-and-Forward Networks, May 1990.

FIG.2

MEMORY TABLE

| WORD | | | | | | | | |
|---|---|---|---|---|---|---|---|---|
| 0 | COLLECT PIN − 2356 ||||||||
| 1 | PL PIN 9446 ||||||||
| 2 | CALL COMPLETE NUMBER ||||||||
| 3 | AC AUTO COLLECT | ACAG | ACA | ITF/ ROAMING 203 | UNAV | PAF | CB | PLCM |
| 4 | PAGING NUMBER ||||||||
| 5 | CALL BACK NUMBER ||||||||
| ○ | ○ ||||||||
| ○ | ○ ||||||||
| ○ | ○ ||||||||
| N | CALL BACK NUMBER ||||||||

202 (words 0–2)
201 (words 3–N)

PERSONAL MOBILE COMMUNICATION SYSTEM WITH CALL BRIDGING

CROSS REFERENCE TO RELATED APPLICATIONS

This application is a Continuation of application Ser. No. 08/606,230 filed Feb. 23, 1996, now abandoned, which is a Continuation of application Ser. No. 08/424,825, filed Apr. 19, 1995, now abandoned, which is a Continuation of application Ser. No. 08/138,887, filed Oct. 19, 1993, now abandoned, which is a Continuation of application Ser. No. 07/667,734, filed Mar. 11, 1991, now abandoned.

FIELD OF THE INVENTION

This invention relates generally to mobile telecommunications, and in particular to a system for establishing telecommunications between a calling party and a called party having a personal mobile communications device, using a paging signal and call bridging.

BACKGROUND OF THE INVENTION

The mobile telecommunications industry has been growing at a rapid rate, owing in part to the increased mobility of its customers and in part to the decrease in the cost of the complex electronic circuits that are found in mobile transmitters and receiving apparatus. With the proliferation of mobile telephone equipment, and the anticipated surge of usage that is likely to occur as a result of personal communications networks and services, it is now and will be quite common to encounter mobile telephone users not only in automobiles and other vehicles but also as pedestrians carrying portable units.

Currently, the most popular form of mobile telephone service is provided by the cellular telecommunication industry. Each cellular user typically subscribes to service with a carrier in a particular geographic region served by that carrier. Calls to the subscriber when in the home region are easily completed, since they are routed to and through a Mobile Telephone Switching Office (MTSO) that includes a database which translates information extracted from the incoming call into signaling information necessary to alert the subscriber. When the subscriber is located in a different region, he or she is designated a "roamer", and call completion becomes more difficult. This is because it is not known, a priori, to which MTSO to route the call. Even if the region in which the roamer is located is known in advance, the MTSO serving that region will not normally contain the translation information necessary to complete the call.

To overcome the roamer problem, various systems have been devised in which a cellular subscriber notifies his or her MTSO that he is or will be located in another geographic area. This allows the necessary information to be transmitted from the "home" MTSO to the "host" MTSO, to provide the translation required for completion of the calls to the roamer. One approach involves a system for automatically updating a database containing the roamer's current location, as described in U.S. Pat. No. 4,901,340 issued to R. C. Crouse et at. on Feb. 13, 1990. This solution does not, however, provide for seamless and ubiquitous connections to roamers, because it is first necessary for individual cellular providers to establish cooperative business relationships with each other and then to implement these relationships by the interconnection of compatible signaling systems, either directly or through third-party roamer management systems.

If the location of the roamer is not available in a database accessible to the MTSO, the roamer can nevertheless be contacted by using land-based or satellite paging. One example of a roaming system which uses paging to reach the roamer is described in an article entitled "Satellite Paging in Cellular Communications" by G. Maile, which appeared in the Proceedings of the International Conference on Cellular and Mobile Communications, p.205–13, published by Online Publications, Pinner, UK, in 1985. According to the author, the expectation that calls can be made and received anywhere has placed significant demands on the mobile terminal paging operation, thereby motivating an alternative approach based on satellite transmission of the paging data.

Another article that describes the development of radiopaging in Europe and an overview of European systems that enable a "roaming" service to be provided across national boundaries, is contained in Telecommunications, vol. 21, no. 11, p. 35–47, November 1987.

In currently available paging systems, when a cellular subscriber is signaled, he or she can receive alphanumeric messages such as the calling party's name and/or phone number. Depending on the nature of the message, the cellular subscriber (called party) can return the call by initiating a new call immediately or at a later time, as appropriate. However, a real time connection (on the same call that caused generation of the paging signal) between the calling party and the cellular subscriber is not made at that time. The called party must, instead, initiate a call back based upon information received from the page. This call may reach the calling party, but the likelihood of call completion is reduced by the fact that the calling party has no indication or expectation that a return call is imminent, and thus may not be available at the same location to actually receive the call. If the return call cannot be completed, the next best option currently available is to connect the cellular subscriber to a voice mail box, in which a message has been left.

SUMMARY OF THE INVENTION

In accordance with the present invention, a system is provided to enable a mobile telephone user, such as a cellular subscriber, to complete a real time connection to a calling party, that has attempted to reach the subscriber using the subscriber's assigned telephone number, even when the subscriber is roaming outside of his or her home area. The system includes a messaging and bridging complex having an associated database, which receives a call placed to the cellular subscriber. If the call cannot be completed, for example because the subscriber is out of his or her home area, information stored in the database is used to initiate transmission of a paging signal to the cellular subscriber (called party). The messaging and bridging complex is also arranged to hold the connection to the calling party for a predetermined period after the paging signal is transmitted. The mobile telephone user, upon receiving the paging signal, may initiate a cellular call from their personal mobile telecommunications device, (e.g., cellular telephone) to the messaging and bridging complex, which is arranged to bridge the calling party and the mobile telephone user together. If desired, the system can also include interactive voice response equipment for advising the calling party that the call cannot be completed and that a paging signal is being transmitted. The calling party may also be offered other options, including an opportunity to use a voice mailbox or other facility to leave a message in the event that the call cannot be completed.

BRIEF DESCRIPTION OF THE DRAWINGS

The present invention will be better appreciated by consideration of the following Detailed Description, which should be read in light of the accompanying drawing in which:

FIG. 2 illustrates one possible arrangement of a memory table entry for each subscriber desiring to use the system in accordance with the present invention, which entry is contained in database 106 of FIG. 1;

DETAILED DESCRIPTION

Figure 1:
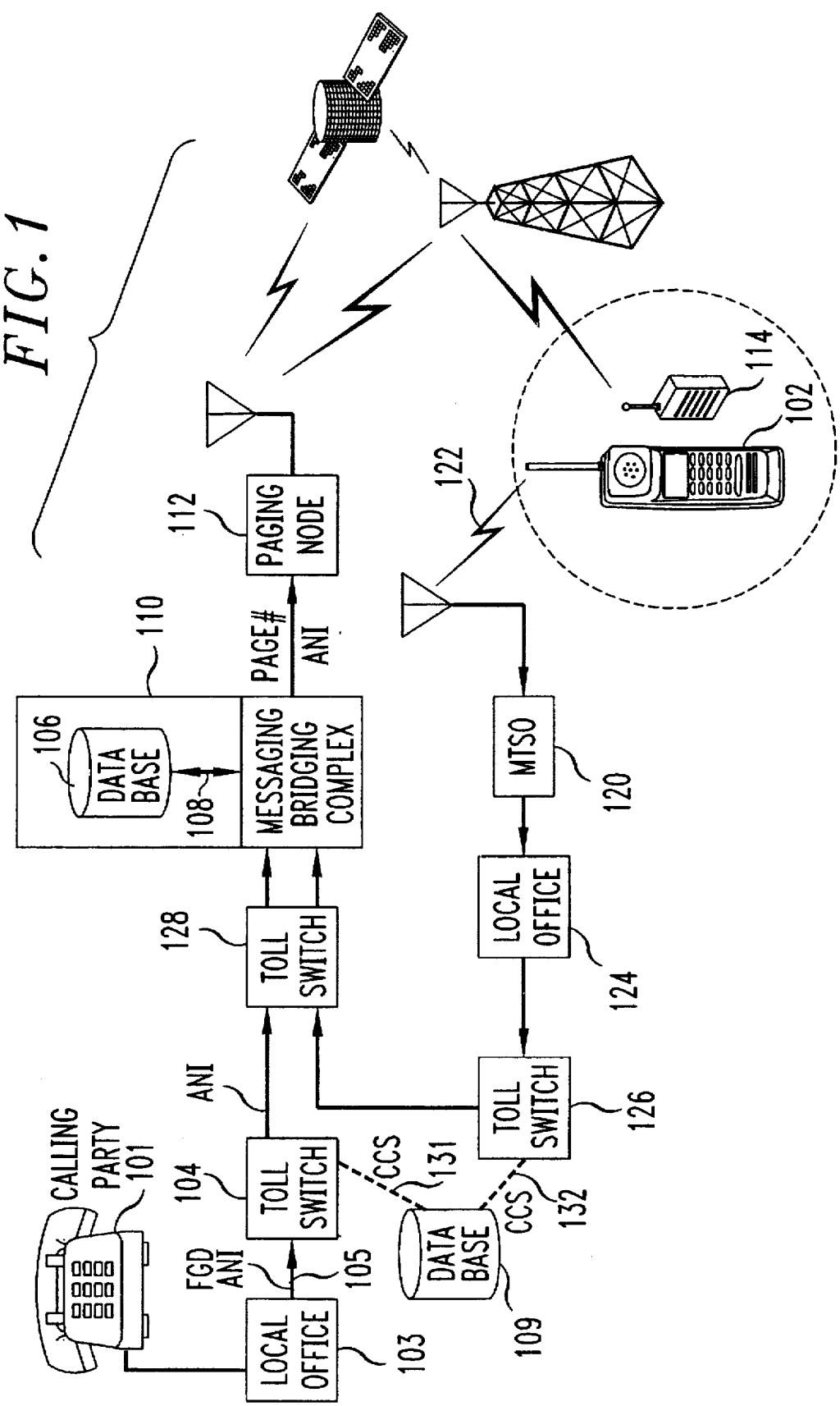
FIG. 1 is an overall block diagram of one arrangement of a system for using a paging signal and call bridging for establishing telecommunication between a calling party and a mobile telephone user such as a cellular subscriber.

FIG. 1 illustrates one embodiment of a system arranged in accordance with our invention, by which a calling party at station 101 may contact a called party (sometimes hereafter referred to as a subscriber) having a personal mobile telecommunications device such as a cellular phone 102 which can be in an automobile or which is otherwise portable. In this system, a call is initiated when the calling party dials a telephone number uniquely indicative of the called party. For example, the number can be 1-800 followed by a seven digit number of the form NXX-XXXX, where N is a digit from 2 to 9 and X is any digit. This number is sometimes referred to as a Person Locator Number (PLN). Alternatively, the call may be initiated through dialing of a special access code (SAC), which uniquely identifies the provider of the service contemplated by our invention, or by dialing another number associated with the service provided by our invention.

The call is extended, in conventional fashion, through a local office 103 to a toll switch 104, via an equal access facility such as a Feature Group D trunk 105. An indication of the telephone number associated with station 101 is extended to toll switch 104 by use of the Automatic Number Identification (ANI) feature presently available when Feature Group D trunks are used to provide access. Toll switch 104, which may be an AT&T 4ESS electronic switching system of the type described in *Bell System Technical Journal*, Vol. 56, No. 7, pp. 1015–1320, published September 1977, is arranged to recognize the PLN, and in response thereto, to query an associated database 109 to determine how to route call. This query may be communicated to database 109 via a link 131 in a common channel signaling (CCS) system. Database 109 may be a general purpose data processor such as an AT&T 3B-20 processor configured as described in U.S. Pat. No. 4,191,860 issued to R. Weber on March 4, 1980, or another database machine arranged to provide similar functionality. Database 109 contains a series of routing translation tables which provide a mapping of the subscriber's PLN to an address which uniquely identifies a person locator memory table stored within a particular messaging and bridging complex. Upon receipt of the address, switch 104 routes the call, together with ANI information (if available), to the appropriate messaging and bridging complex, in this case to complex 110 via toll switch 128. Advantageously, messaging and bridging complex 110 can be implemented in CONVERSANT® Voice Information System Release R1V2.1 available from AT&T.

Messaging and bridging complex 110, upon receipt of a call, is arranged to query an associated database 106, which also may be a general purpose data processor such as an AT&T 3B-20 processor. This database contains information described in more detail below in connection with FIG. 2, which includes an In-Transit Flag (ITF), which indicates the roaming status of the subscriber.

The status of this flag (and other information in the database record) can be controlled manually as described in U.S. Pat. No. 4,313,035 issued to Jordan et al. on Jan. 26, 1982, or automatically as described in the patent application Ser. No. 07/607925 filed on behalf of Bissell and Campano on Nov. 1, 1990, which is assigned to the same assignee as the present application. For the purposes of this part of the description, it is sufficient to recognize that database 106 can indicate to complex 110 that the called party is not reachable by an ordinary cellular call, and that the paging and bridging functionality provided by the present invention is necessary to effect real time communication between the calling and called parties. Complex 110 can in the same query concurrently retrieve a paging number associated with the subscriber, which is used as described below. It is to be noted here that the query to database 106 and the status response to complex 110 can be communicated via a data link 108, which could be external if those units are not integrated.

If the ITF is enabled, messaging and bridging complex 110 is arranged to play an announcement to the calling party, for example stating that "The party you are calling is not available at this time. If you care to hold, please press '1' now, and we will attempt to page and connect you with your party." Optionally, messaging and bridging complex 110 can be arranged to add a further announcement, to the effect that "If at any time you would like to terminate this call and leave a message, please press '2'." Messaging and bridging complex 110 is easily programmed to detect the entry of dialed digits (touch tones) and to respond by connecting the calling party to means for electronically storing messages. For the limited number of instances in which the calling party does not enter touch tones, the call can be forwarded to an operator, or, as a default, also be connected to an electronic message storage system.

If the calling party enters a "1", messaging and bridging complex 110 initiates a call to a paging node 112, transmitting to the node both the subscriber's paging number obtained from database 106, as well as the ANI information identifying the calling party telephone number, if such ANI information is available. Paging node 112 can be a satellite paging facility of the type operated by numerous paging service providers such as SKYTEL(TM), that are equipped to transmit a paging signal to receivers located anywhere within a desired geographic area.

When the paging signal is received at the paging receiver device 114 carried by the subscriber, information identifying the calling party's telephone number and/or a preselected telephone number reserved for completion of bridging of cellular calls in messaging and bridging complex 110 may be available, if device 114 is of the type that can receive and display alphanumeric information. However, the calling party's number is primarily intended to be used for call screening rather than for the purpose of call-back. If device 114 is more rudimentary, the paging signal may simply indicate to the subscriber that a call has been made using the system of the present invention. In either event, immediate communication with the calling party will be possible by the initiation of a return call to a preselected telephone number associated with complex 110. This number would, of course, be provided to the subscriber in advance, if a rudimentary paging device is used. It is to be noted here that paging receiver device 114 and cellular phone 102 can be integrated into a single physical unit, such as the PAGERPHONE(TM) currently offered by Universal Cellular.

After the subscriber initiates a call from a personal mobile telecommunications device such as cellular phone 102 to complex 110, the call is typically routed, in conventional fashion, to a mobile telephone switching office (MTSO) 120 via a radio link 122. From this point, the call is routed normally, usually through a switch 124 in a local switching office and one or more toll switches such as toll switches 126 and 128. Toll switch 126 may access database 109 using CCS link 132, in order to obtain network routing information. As stated previously, complex 110 may be a CONVERSANT Voice Information System arranged to issue voice prompt scripts in response to calls received at particular numbers. In this case, upon receipt of a call placed to the preselected telephone number, messaging and bridging complex 110 may play an announcement requesting the subscriber to enter a personal identification number (PIN). When the correct PIN is entered and verified, the call made by the subscriber is bridged in complex 110 to the original call, and real time communication is enabled.

FIG. 2 illustrates one possible arrangement of a memory table entry or record contained in database 106 of FIG. 1 for each subscriber desiring to use the system in accordance with the present invention. This entry or record is essentially the same as the record illustrated in FIG. 5 of the above referenced Jordan patent, but contains an entry in field 201, indicating the paging number associated with each subscriber. Note that record contains an in-transit flag (ITF) 203, which can be set to a predetermined value to indicate that the subscriber wishes to invoke call treatment as contemplated by our invention. This is particularly useful when the subscriber is roaming outside of his or her home area.

When database 106 is accessed by complex 110, the appropriate record is retrieved by a lookup operation performed using the complex routing address as a key. If the ITF is set, indicating that the subscriber is roaming, the corresponding paging number contained in field 201 is returned to messaging and bridging complex 110. This paging number can be a telephone number or an identification number that uniquely identifies the subscriber's paging receiver. If the ITF is not set, the call can be completed to the regular cellular number for the subscriber, as contained in the call complete field 202, or to another destination specified by the person locator number (PLN) described in the above-cited Jordan patent.

Figure 3:
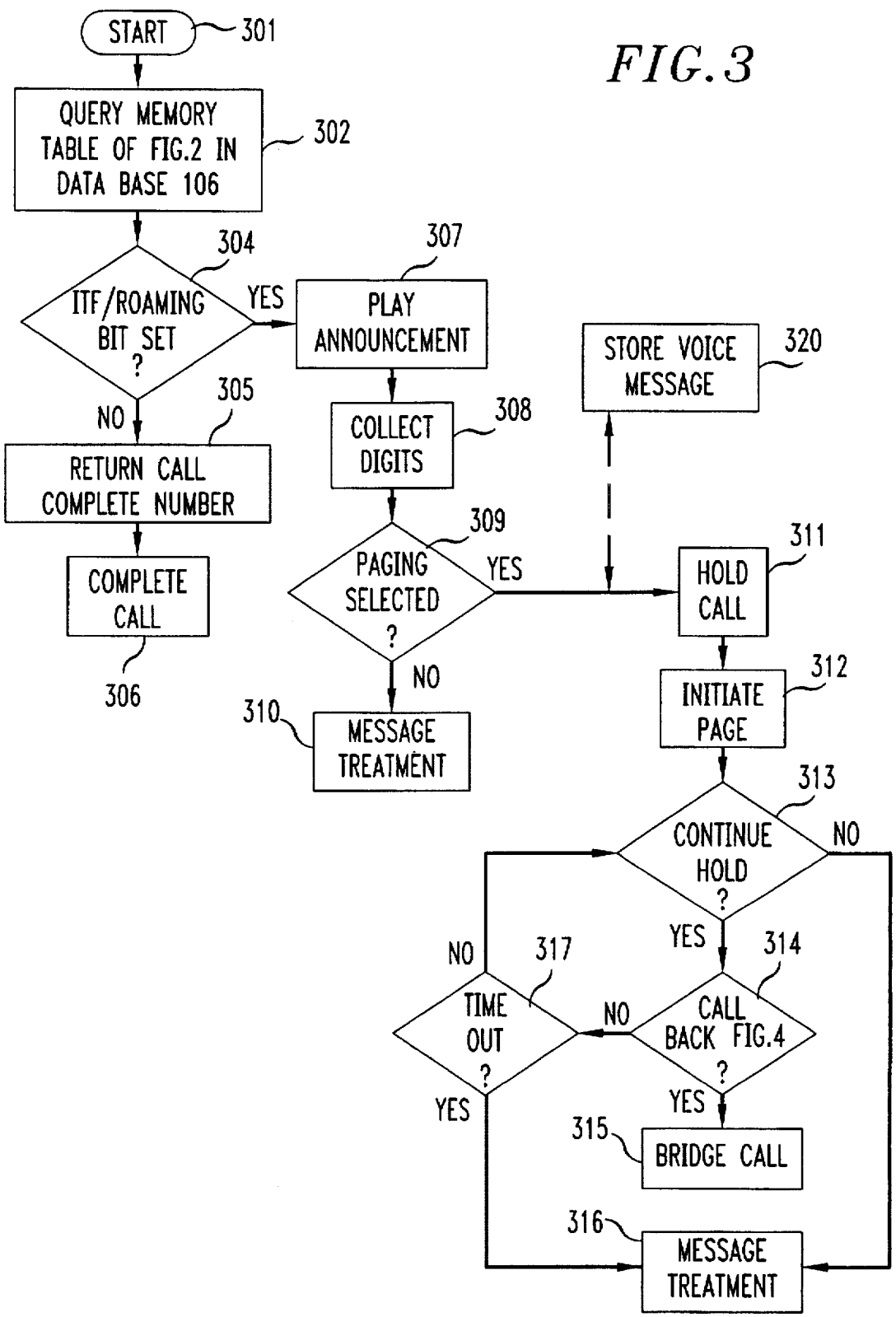
FIG. 3 illustrates in flow diagram format, the steps followed using the apparatus of FIG. 1 in order to initiate transmission of a paging signal to a mobile telephone user such as a cellular subscriber when the subscriber is roaming in a foreign service area.

FIG. 3 illustrates in flow diagram format, the steps followed using the apparatus of FIG. 1 in order to complete a call placed to a mobile telephone user such as, for example, a cellular subscriber when the subscriber is roaming in a foreign service area. The process of FIG. 3 begins in step 301, which is initiated when the calling party places a call to the subscriber and the call is routed to messaging and bridging complex 110 via toll switches 104 and 128. The call has been routed to complex 110 using an address which uniquely identifies a particular person locator memory table or record stored within the complex. In step 302, a query is initiated by complex 110 to database 106, so that the appropriate database memory table or record can be retrieved. Database 106 translates the complex address to an address at which the associated record, having the format illustrated in FIG. 2, is stored. This record is examined in step 304, to determine if the ITF is set, indicating that the telephone subscriber is roaming in a foreign service area. If a negative result is obtained in step 304, a conventional destination number (ie, the cellular number assigned to the subscriber in his or her home area) is retrieved, and the call is completed in step 306 as a conventional cellular call. On the other hand, if a positive result is obtained in step 304, an announcement generated in messaging and bridging complex 110 is returned to the calling party in step 307, and the digits entered by the calling party are collected by messaging and bridging complex 110 in step 308. The announcement/digit collection functions are conventional in CONVERSANT equipment.

It is to be noted here that the announcement played to the calling party in step 307 can be the simple 2-choice query described above, or a more complete menu of options, some leading to conventional call treatment and others allowing the real time bridging contemplated by our invention. For example, the calling party may have the choice of: (1) leaving a voice message; or (2) leaving a voice message, but paging the subscriber to alert him/her that a priority message is waiting; or (3) paging the subscriber and leaving a number for a call-back at a later time.

Step 309, also performed by messaging and bridging complex 110, examines the collected digits to determine if the calling party desires to hold the call, such that the subscriber can be paged and subsequently connected. If the calling party does not wish to hold, a message can be stored in messaging and bridging complex 110 in step 310, whereupon the call is terminated.

In situations in which the calling party desires to hold for an immediate connection to the called subscriber, a positive response is detected in step 309 and the call is "held" in step 311. This function, performed in messaging and bridging complex 110, is accomplished by connecting the original call to one input or leg of a bridge. When the called party is connected to a second bridge input or leg, the call path is completed, and two way communication is possible.

If the calling party enters a positive response in step 309, an optional step 320 can next be performed, in which complex 110 plays a message requesting the calling party to provide a brief indication of his or her identity and the purpose of the call. This information is stored within complex 110, so that, at the time the subscriber calls back, the brief message can be retrieved and played back. This is done so as to give the subscriber additional call treatment options. For example, if the subscriber does not wish to be bridged to the calling party at that time, he or she can signal complex 110 to prompt the calling party to leave a message. This is discussed in more detail in connection with step 407 in FIG. 4.

When the calling party has been placed on hold in step 311, the subscriber is signaled by paging node 112 of FIG. 1, in step 312. Advantageously, this paging, as stated previously, can be accomplished by satellite, so that a wide geographic area can be reached. Alternatively, land based paging can be used, as long as the paging signal is capable of being received in the geographic area in which the called party is likely to be located. Steps 313 and 314 are next initiated in sequence, during the interval between the page and the receipt of a response from the called subscriber, in order to assure that the calling party wishes to continue to hold. Specifically, an announcement generated in messaging and bridging complex 110 may be made to the calling party in step 313, inquiring whether the caller wishes to continue to hold. If a positive response is detected, and bridging has not yet been effected by messaging and bridging complex 110, step 313 may be repeated after a desired time interval has elapsed, as long as step 317 indicates that a predetermined timeout interval has not elapsed. If a negative response is detected in step 313, or if the elapsed time exceeds the predetermined time out interval in step 317, a message may be left in step 316 in the same manner as provided in step 310.

Figure 4:
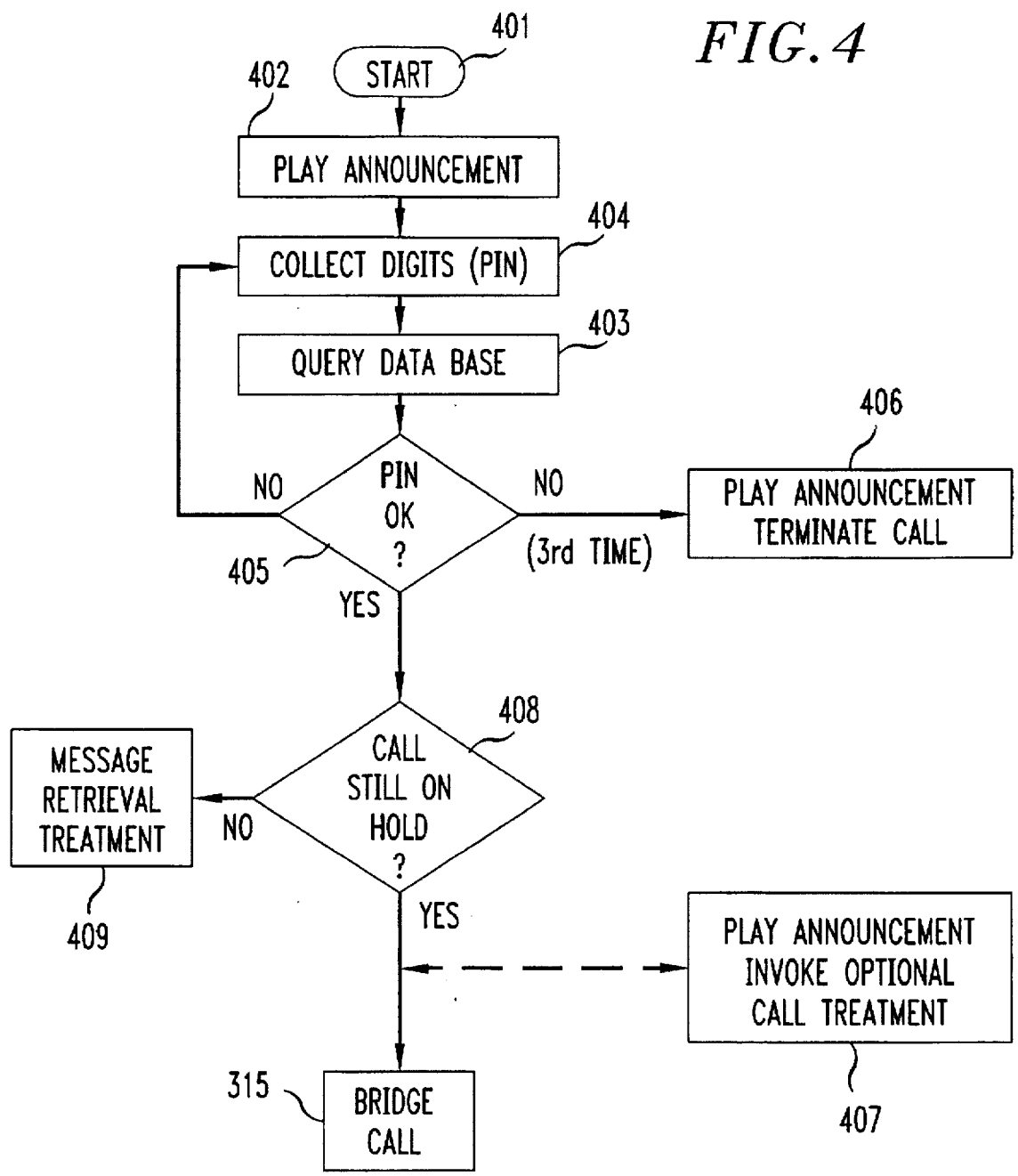
FIG. 4 illustrates in flow diagram format, the steps followed using the apparatus of FIG. 1 in order to complete the bridging connection between the cellular subscriber receiving the paging signal transmitted using the process illustrated in FIG. 3 and the calling party.

FIG. 4 illustrates in flow diagram format, the steps followed using the apparatus of FIG. 1 in order to complete the bridging connection between the subscriber receiving the paging signal transmitted using the process illustrated in FIG. 3, and the calling party. The process of FIG. 4 begins in step 401, after the subscriber initiates a call from his/her mobile telecommunications device (such as cellular telephone 102) that is received in MTSO 120, and routed to messaging and bridging complex 110 via local office 124 as well as toll switches 126 and 128 and any other intermediate switches located in the public switched telecommunications network (PSTN). When the call reaches complex 110 an announcement is played to the subscriber in step 402 requesting the subscriber to enter his/her PIN, and the digits are then collected in step 404. Next, a query is directed to database 106 in step 403, in order to access the appropriate subscriber record. Thus differentiation between individuals subscribers; can be accomplished by providing each subscriber with a unique access number for dialing into complex 110, or by using a common access number and thereafter requesting the subscriber, in step 402 to enter a unique PIN assigned to that subscriber.

If the PIN entered by the subscriber is not valid, as determined in step 405, step 404 may be repeated for a predetermined number of times before an announcement terminating the call is played in step 406. On the other hand, if the PIN is valid, a check is made to determine if the calling party is still on hold. If a positive response is received, and if optional step 320 was invoked in the process of FIG. 3, the brief message stored by the calling party can be retrieved and played to the subscriber at this time. The subscriber can then decide to proceed in step 315 to be bridged to the call, or can choose other call treatment options, through input of touch tone signals to complex 110. These options can include connecting the calling party to the subscriber's voice mailbox, or playing one of several prerecorded messages suitable for playback to the calling party. Alternatively, step 407 may be skipped, and the subscriber bridged to the calling party in step 315.

If it is determined in step 408 that the calling party has terminated the call (for example, in step 313 of FIG. 3), the process of FIG. 4 proceeds to step 409, in which the subscriber is allowed to access and retrieve messages stored in complex 110 in his or her voice mailbox.

Figure 5:
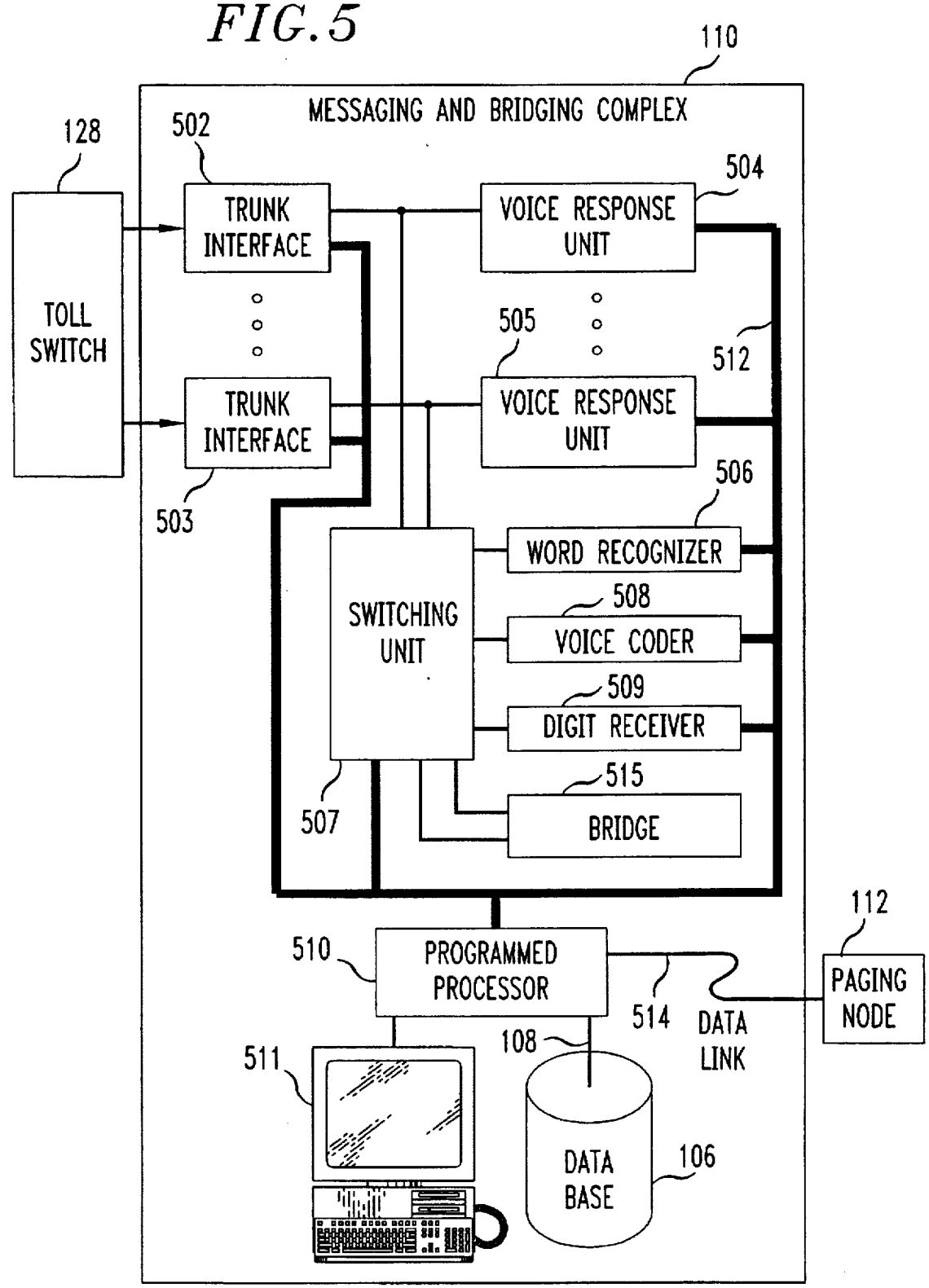
FIG. 5 illustrates in block diagram form, the messaging and bridging complex 110 of FIG. 1.

FIG. 5 is a block diagram showing the interrelationship between the major elements in messaging and bridging complex 110 shown in FIG. 1. This diagram is essentially the same as the arrangement illustrated in FIG. 2 of U.S. Pat. No. 4,896,346, issued to W. R. Belfield et al. on Jan. 23, 1990, entitled "Password Controlled Switching System". As stated previously, the CONVERSANT Voice Information System Release R1V2.1 is a system having the functionality described in FIG. 5. It is to be noted however, that any system that can store announcements, typically in synthesized electronic form, play the announcements in response to the receipt of collected digits, perform voice mailbox functions, including the storage of messages left by a calling party, so that they can be retrieved by the called party at a later time, and to bridge together calls connected to first and second bridging connections, may be used.

In FIG. 5, calls received in complex 110 via toll switch 128 are connected to one of a series of trunk interfaces 502,503, which route signaling information associated with the call (such as called number and ANI, if available) to a programmed processor 510 via data bus 512, and the call itself to a switching unit 507. In the case of an incoming call directed to a subscriber, programmed processor 510 queries (step 302 in FIG. 2) the person locator memory table or record (FIG. 2) contained in database 106 to determine the value of the ITF associated with the called party. If the ITF is enabled, processor 510 transmits voice prompt digital data stored in database 106 via bus 512 to one of the voice response units 504,505, so that the message described in step 307 of FIG. 3 can be played to the calling party.

Complex 110 is equipped with a digit receiver 509 and a word recognizer 506 arranged to detect and recognize the calling party's response. The response is routed to these units via switching unit 507, under the control of processor 510. Upon receipt of a positive response from the calling party, the call is connected to one input or leg of a bridge 515, again via switching unit 507 under the control of processor 510, and a command is transmitted to paging node 112 over data link 514, to generate a paging signal to the subscriber. The information needed to signal paging node 112 is obtained from the memory table in database 106 as well as from ANI information, if available, which was previously provided to processor 510. Optionally, if the calling party is requested to leave a brief message (step 320 in FIG. 3), an announcement to that effect, stored in database 106, is played in the same manner as the announcement described above. The message returned by the calling party is routed to voice coder 508, converted to digital form, and stored in database 106, all under the control of processor 510. Administrative terminal 511, which may be a computer terminal or personal computer, is provided in complex 110 for operations, administration, maintenance and overall management.

When the subscriber initiates a call-back, the routing described above occurs with respect to signaling information (forwarded to processor 510) and the call itself (forwarded to switching unit 507). In this instance, the message played to the subscriber (step 402 in FIG. 4) is different, and is retrieved from a different storage area in database 106 based upon the telephone number dialed by the subscriber. The PIN entered by the subscriber is detected and recognized by digit receiver 509 or word recognizer 506, and checked against stored information in database 106. If the PIN is determined to be valid, the incoming call is connected through switching unit 507 to the second input or leg of bridge 515, thereby connecting the subscriber to the calling party. Optionally, the subscriber can retrieve (step 407 in FIG. 4) the brief message stored in database 106. This is accomplished by routing the stored message via bus 512 to one of the voice response units 504,505. As pointed out in the above-cited Belfield patent, numerous changes may easily be made in the messaging and bridging complex 110 of FIG. 5.

Persons of ordinary skill in the art will appreciate that many changes and adaptations of the present invention may be made without departing from the spirit of the invention, which is limited only by the appended claims. For example, while FIG. 1 depicts separate databases 106 and 109 supporting complex 110 and toll switches 104 and 126 respectively, it will be understood by those of ordinary skill in the art that a single database can perform the same functions and be accessed from multiple points. In addition, the functions performed by complex 110 can be incorporated into toll switches 104, 126 or 128, or into local switch 103, or indeed into the switching fabric of any network, such as a private, cellular or local exchange network. Database 106 of FIG. 1 is shown as being internal to complex 110. However, it will be readily appreciated that in some commercial implementations, the database may be an adjunct that is external to the complex itself.

Certain other modifications can also be made to our invention. Thus, voice inputs and voice recognition systems can replace touch tone dialing and touch tone receivers such as would be normally used in conjunction with complex 110. Also, even though it was stated previously that a PLN is used to uniquely identify a single subscriber, it is known that groups of subscribers (for example, sales people on a single project) can share a particular PLN and, when required, individuals sharing the same PLN can be uniquely distinguished from each other through additional predetermined inputs (such as a PIN) requested from the subscriber.

The invention claimed is:

1. A system for completing calls directed to a called party equipped with a personal mobile telecommunications device capable of originating and receiving telephone calls, said telecommunications device having an associated home geographic region, said system comprising a bridge having first and second inputs for establishing a real time two-way call connection between two separate calls received at said first and second inputs;

a switch for receiving a call from a calling party to a called party;

means responsive to a query generated by said switch in response to said call for determining if said called party is roaming outside of said home geographic region;

means responsive to an output from said determining means indicating that said called party is roaming, for announcing to said calling party placing said call to said called party that said called party is not presently able to receive said call and for receiving a signal generated by said calling party in response to said announcement indicating that the calling party is willing to wait;

means responsive to said signal for causing said switch to connect said call from said calling party to said first bridge input;

means for paging said called party; and means for connecting a second call originated by said called party from said personal mobile telecommunications device to said second bridge input, so that a real-time two-way call connection is established between said calling party and said called party.

2. The invention defined in claim 1 wherein said personal mobile telecommunications device is a cellular telephone.

3. The invention defined in claim 1 wherein said paging means includes satellite transmission means for transmitting a paging signal over a wide geographic area.

* * * * *